United States Patent [19] [11] 3,915,692
Herbert et al. [45] Oct. 28, 1975

[54] PYROMETALLURGICAL PROCESS FOR THE TREATMENT OF SOLIDS, PREFERABLY METALLURGICAL RAW MATERIALS OR INTERMEDIATES

[75] Inventors: Rolf Herbert, Muhlheim; Reiner Homann, Homberg; Lothar Reh, Bergen-Enkheim; Carl-August Maelzer; Martin Rahn, both of Frankfurt am Main, all of Germany

[73] Assignees: Metallgesellschaft Aktiengesellschaft, Frankfurt am Main; Deutsche Babcock & Wilcox Aktiengesellschaft, Oberhausen, both of Germany

[22] Filed: Oct. 19, 1973

[21] Appl. No.: 407,959

[30] Foreign Application Priority Data
Oct. 28, 1972 Germany............................ 2253074

[52] U.S. Cl. ........................... 75/23; 75/26; 75/40; 75/74; 75/92; 75/91
[51] Int. Cl.² ........................................ C21B 1/04
[58] Field of Search ............... 75/26, 40, 23, 91, 92, 75/74; 266/24, 10; 432/58

[56] References Cited
UNITED STATES PATENTS

| | | | |
|---|---|---|---|
| 2,745,732 | 5/1956 | Oster | 75/40 |
| 2,865,734 | 12/1958 | Klemantaski | 75/40 |
| 2,870,003 | 1/1959 | Cavanagh | 75/26 |
| 3,579,616 | 5/1971 | Reh et al. | 423/625 |
| 3,607,224 | 9/1971 | Blaskowski | 75/26 |
| 3,687,656 | 8/1972 | Maelzer et al. | 75/74 |
| 3,744,962 | 7/1973 | Ritzmann | 432/58 |
| 3,759,501 | 9/1973 | Foard | 266/24 |
| 3,767,768 | 10/1973 | Reh et al. | 423/179 |
| 3,790,366 | 2/1974 | Bryk et al. | 75/23 |

Primary Examiner—C. Lovell
Assistant Examiner—M. J. Andrews
Attorney, Agent, or Firm—Karl F. Ross; Herbert Dubno

[57] ABSTRACT

A pyrometallurgical process for the processing of solids and especially metallurgical intermediates and ores which form molten products at the treatment temperature, provides a mixture of the solids in finely divided form, high-oxygen gases and any energy carriers (carbonaceous or noncarbonaceous exothermic reactants with oxygen) which are combined to form a suspension which is introduced into a vertical combustion passage at a velocity preventing backfiring and at a temperature of the mixture which is less than that of the reaction. In the vertical combustion passage, the components of the reaction interact and the resulting suspension contains molten particles and is introduced into a cyclone chamber having a generally horizontal axis. The cyclone and a combustion chamber have walls cooled by evaporation of water against a superatmospheric pressure.

10 Claims, 3 Drawing Figures

3,915,692

PYROMETALLURGICAL PROCESS FOR THE TREATMENT OF SOLIDS, PREFERABLY METALLURGICAL RAW MATERIALS OR INTERMEDIATES

CROSS-REFERENCE TO RELATED APPLICATION

The present application is related to the copending application Ser. No. 229,280 filed Feb. 25, 1972 (now U.S. Pat. No. 3,767,768) and to the prior application mentioned therein as well as to the Pat. Nos. 3,579,616 and 3,687,656 which were copending with the above-mentioned application and have since issued.

FIELD OF THE INVENTION

The present invention relates to a process for the pyrometallurgical treatment of solids for recovery of components thereof and, more particularly, to a pyrometallurgical process for treating fine-grain solids at a treatment temperature at which the raw materials form molten products.

BACKGROUND OF THE INVENTION

While various processes have been described for the treatment of solids to recover components therefrom, especially for the metallurgical treatment of ores and ore concentrates or metallurgical-plant intermediates, the present disclosure is directed to pyrometallurgical systems which utilize cyclone reactors as described, for example, in the above-identified application and patents. Thus it is known from these disclosures and elsewhere to subject sulfidic iron ores or sulfidic iron-ore concentrates to pyrometallurgical treatment in a cyclone chamber having a generally prone (horizontal or slightly inclined) axis, the walls of which are cooled by evaporating water under a presssure of at least 10 kg/cm$^2$. The cyclone reactor is supplied with gases containing at least 30% oxygen and no fuel or little fuel is mixed therewith. The gases entrain the particulates in a cyclonic path along the wall of the reactor chamber which, because of the cooling, has a coating of solidified molten material. The molten material is in the form of a relatively thin layer which is capable of digesting large quantities of the solids and molten reaction products and the system is found to be a major advance over still earlier pyrometallurgical techniques. Using the aforedescribed systems, a molten matte having an average iron: sulfur atomic ratio of 1:0.7 to 1:0.9 may be formed if the treatment is carried out at a temperature above 1,300°C and a molten matte having an average iron:oxygen atomic ratio of 1:1.0 to 1:1.5 can be obtained where the treatment is carried out at temperature above 1,400°C.

After considerable work with cyclone reactors of the aforedescribed type, we have found that various problems are encountered which appear to be a result of the fact that a number of complicated processes are carried out alongside one another or concurrently in the closed cyclone chamber and exert significant influences upon one another.

The processes which have been found to influence the reaction are those of mixing of the reactants within the cyclone chamber, the heating of the individual reactant zones until mixture occurs and the heating of the mixture thereafter to the ignition temperature by heat radiation and convection, the combustion and evaporization products which may break up and uniform reaction zone, the collection of molten droplets from the gas, the transfer of the molten droplets to the layer of molten materials along the wall of the cyclone chamber, and even the discharge of the molten material itself.

Because of the large number of interrelated processes and relationships within the generally cylindrical and substantially horizontal cyclone chamber, the combustion and volatilization conditions are not uniform for all particles. The temperature varies throughout the chamber depending upon the gas turbulence and the other conditions mentioned previously. Part of the fuel or ore may be carried off before combustion or roasting has been completed or may be incorporated in the melt so that reaction thereof takes place only upon limited exposure of reaction surfaces or with a net decrease in the available reaction surface. consequently, the reaction rate may vary and various reactions may not be carried to completion.

It has been found that, especially with high space loads of the solids in the cyclone chamber, solids streaks tend to form in the gas/solid mixture and to limit the extent and efficiency of the reaction.

OBJECTS OF THE INVENTION

It is the principal object of the present invention to provide a process for the pyrometallurgical treatment of finely divided solids which ensures complete reaction, produces purer products and is of increased efficiency over the conventional system.

Another object of the invention is to provide an improved process for the purposes described which carries the reaction further toward completion but does not require expensive equipment.

Still another object of the invention is to provide a process which extends the principles set forth in our prior work with generally horizontal pyrometallurgical cyclones and thereby eliminate some of the disadvantages characterizing such systems.

SUMMARY OF THE INVENTION

As will be discussed in greater detail below, we have discovered that, when a substantially horizontal cyclone chamber having walls cooled by evaporation of water against an elevated pressure, is preceded by an upright reaction chamber opening downwardly into the cyclone chamber and all of the reactants and a high-oxygen gas are premixed and introduced into this chamber in suspension, a highly uniform and substantially homogeneous reaction takes place therein and consequently the reaction is almost complete when the mixture flows into the cyclone which, in the present case, primarily constitutes the means for recovering the molten metal from the combustion gases although it also sustains a minor part of the overall reaction.

Of course, the mixture of the reactants and high-oxygen gas is effected at a temperature below the reaction temperature so that the reaction only commences when the mixture enters the downwardly open upright combustion chamber, the velocity of the mixture upon entry into the chamber being such that blowback or flashback is precluded.

In a pyrometallurgical process in which fine-grained solids, which at the treatment temperatures form molten products, are treated with high-oxygen gases and, if desired, energy carriers by means of a cyclone chamber, this object is accomplished according to the invention in that the solids, high-oxygen gases and any energy carriers are mixed to form a suspension, which is at a temperature that is below the reaction temperature and which at a velocity which precludes backfiring is charged into a vertical combustion passage, in which the components of the reaction are caused to react, and the resulting suspension which now contains mainly molten particles is introduced into the cyclone chamber.

The charging of the suspension at a velocity which precludes backfiring may be carried out in various ways. For instance, the reactants may be mixed in such a manner that the suspension is at a suitable high velocity. It will be particularly desirable, however, to provide before the combustion passage a charging device which has a nozzlelike constriction and in which the suspension is accelerated to a sufficiently high velocity. As a result, the streaks and bunches which otherwise tend to form in the suspension are dispersed. The suspension is perfectly homogenized so that the surface of the particles can be fully utilized in the reaction.

According to a particularly desirable feature of the process, the residence time in the combustion passage should be so long that the reaction has been carried out to a conversion of at least 80% when the suspension leaves the combustion passage. The reaction times are of the order of a few hundredths of a second so that a combustion passage having a length up to 3 meters is generally sufficient.

The temperature of the gas leaving the cyclone chamber is preferably controlled to have a temperature which is at least 100°C above the temperature at which the melt begins to solidify.

If the reaction between the solids to be treated in the process according to the invention and the high-oxygen gases is endothermic or is not sufficiently exothermic to be thermally self-sustaining, any desired energy carrier can be admixed to the suspension. Energy carriers are substances which liberate heat when burnt with oxygen. They may be used in solid, liquid, or gaseous form.

Each of these fuels may be used alone or in a mixture with others. To form the suspension it is desirable to premix gaseous fuels with the high-oxygen gases and to premix solid fuels with the fine-grained solids to be treated. Instead of carbonaceous fuels, substances may be used which are free from carbon and which liberate heat when reacted with oxygen. Such substances are, for instance, pyrite and sulfur.

The specific surface of the particles should be 10 – 1,000m$^2$/kg, preferably 40 – 300 m$^2$/kg. These values correspond to a mean particle diameter of 3 – 300 microns, preferably 10 – 80 microns, respectively.

The gas velocity in the combustion passage, based on an empty tube, is about 8 – 30 meters per second (m/sec.).

For the purposes of the invention, high-oxygen gases are gases which contain at least 30% oxygen by volume. If gases having the desired oxygen concentration are not available, they are produced by mixing air and highly concentrated oxygen. For this purpose, oxygen and air, separately or mixed together may be supplied to the fine-grained solids as they are mixed. This practice is particularly desirable if oxygen of 70% concentration is available. Such oxygen can be economically produced.

If the fine-grained solids to be treated in the process according to the invention contain volatilizable metallic constituents, sufficiently high temperatures must be maintained. For instance, a temperature above 1,300°C is particularly desirable for the volatilization of zinc sulfide. In the processing of pyrite, temperatures of 1,600°C may be produced with the aid of gases which contain about 55% oxygen. At such high temperatures more than 90% of zinc and more than 95% of arsenic and lead can be volatilized. Silver, cadmium, rhenium, selenium, tellurium, germanium, antimony, bismuth can be volatilized with similarly good results. The decisive advantage afforded by the process according to the invention resides in that the cyclone chamber serves mainly as a separator to ensure a clean separation of the components which are in different physical states.

The exhaust gases leaving the cyclone chamber may be cooled in a waste heat boiler. It has been found to be particularly desirable to conduct the gases which have left the cyclone chamber through a deflecting path, in which any entrained molten droplets are separated, and then to quench the gases directly injecting water into them and/or mixing the gases with air. As the gases are quenched, the molten droplets are cooled below a solidification point and gaseous products are cooled below a condensation or desublimation point so that these materials are transformed into easily separable solids.

The process according to the invention may be applied to a variety of solid materials and has been found to be of special advantage with sulfidic nonferrous metal ores or sulfidic nonferrous metal-ore concentrates and to sulfidic iron ores or sulfidic iron-ore concentrates. It can be applied with very good results to the treatment of iron oxide ores or of iron oxide ore concentrates, possibly after a preliminary reduction, as well as to the treatment of intermediate metallurgical products of these general types.

DESCRIPTION OF THE DRAWING

The above and other objects, features and advantages will become more readily apparent from the following description, reference being made to the accompanying drawing in which.

SPECIFIC DESCRIPTION

Figure 1:
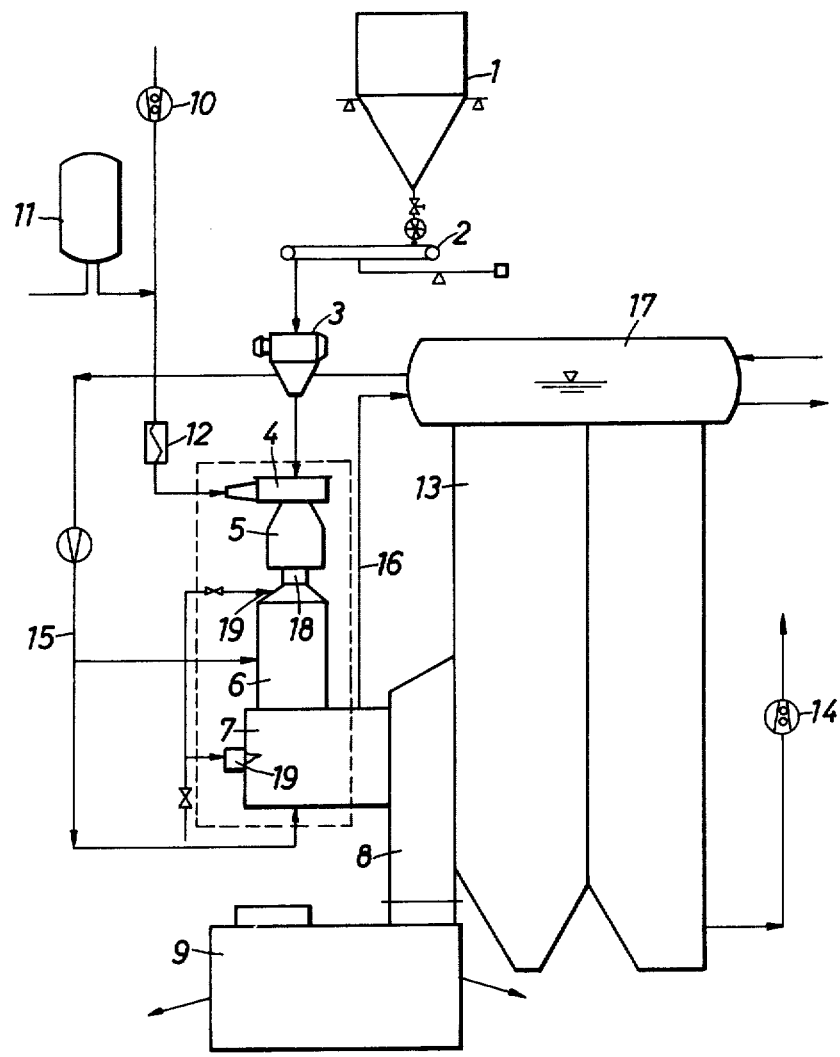
FIG. 1 is a flow diagram illustrating the process according to the invention.

The solids, to which the energy carrier may be admixed, are stored in a supply bin 1 (FIG. 1). Before the solids are stored in the supply bin, they are suitably dried to a residual moisture content below 0.2% H$_2$O, and unless they have been supplied in the desired fineness, as is the case with floatation material, they are ground to the required fineness. The solids are withdrawn from the supply bin 1 over a metering weighing belt conveyor 2 and pass through metering rolls 3, which provide a pressure seal against the high-temperature reactor, and a downpipe into the central feed pipe of a proportioning device 4.

The oxygen required for the reaction is contained in a gas mixture which is composed of an air stream that is sucked by the blower and of a highly concentrated oxygen stream that is sucked by the blower and of a highly concentrated oxygen stream coming from a cold vaporizer 11. By a change of the ratio of the two component streams, any oxygen concentration which may be required to provide for the desired reaction temperature in the high-temperature reactor may be adjusted in the mixed gases. In a heat exchanger 12, these mixed gases may be heated up to 600°C, and the waste heat of the process may be used for this purpose. The mixed gases are desirably preheated to a temperature such that the temperature of the gas-solids suspension is slightly below the ignition temperature of the solids which are to be reacted.

The preheated, high-oxygen gas for supporting the combustion and the cold solids stream are discharged from the proportioning device 4 in concentric free jets and due to the turbulence of said jets and to the swirl imparted to the high-oxygen gas are intensely mixed in the mixing chamber 5. At a temperature which is slightly below the ignition temperature, the resulting suspension is accelerated in a nozzlelike constriction 18 so that the suspension is further homogenized and a backfiring from the combustion passage 6 into the mixing chamber 5 is prevented.

The accelerated jet will be immediately ignited as it enters the hot vertical combustion passage 6. In a short, hot flame, the solid particles pass through the melting phase substantially without contacting a wall surface or each other so that the large particle surface is preserved as an exchange surface for the reaction. At the end of the combustion passage 6, the reaction is almost complete and the maximum combustion temperature is reached. This temperature depends on the theoretical combustion temperature and on the inevitable heat losses due to the cooling at the wall.

The reaction flame is so long that it enters into the cyclone chamber 7, in which the reaction is virtually completed and the gaseous and liquid reaction products are separated by the action of centrifugal force to form a molten film having a high ability to incorporate molten particles. The walls defining the vertical combustion passage 6 and the horizontal cyclone chamber 7 are exposed to the highest temperatures and are effectively protected by an evaporative cooling system (pipes 15, 16, boiler 17), which causes the formation of a coating of solidified melt.

The collected molten film passes, from the cyclone chamber 7 as a jet, an outlet slot 21 into a secondary chamber 8 and further through a vertical well into a settler 9. The gas flows through a neck into the secondary chamber 8, where it is deflected twice through 90° to enable a separation of additional molten droplets which have been entrained by the gases leaving the cyclone. The collected droplets drain together with the melt into the settler 9.

The settler 9 may be divided by a siphonlike parting block into two settling chambers. In the settler 9, two melt components having different specific gravities may be separated during a residence time of more than one hour and may be separately withdrawn. Specifically, matte may be separated from slag. The melt may be subjected to an aftertreatment in that admixtures are added and gases are blown onto the surface of the melt. The separately withdrawn components of the melt may be directly granulated in a water jet or tapped into ladles, as desired.

The exhaust gas, which is substantially free of molten material, passes at a low velocity from the secondary chamber 8 into the gas-cooling passage 13. In the latter, the exhaust gas has substantially its final composition and a high percentage of gaseous combustion products. If the starting solids contain volatilizable constituents, the exhaust gas will generally be laden with considerable amounts of gaseous volatilization products.

The exhaust gas, laden with small amounts of molten material and possibly with gaseous volatiliztation products, is cooled in the gas-cooling passage 13 through the solidification range of the molten material and below the condensation temperature of most volatilization products. Before the point at which the temperature is sufficiently below the solidification temperature, the gas-cooling passage has no convective cooling surfaces.

The cold gases produced by the reaction are delivered by a blower 14 to a gas-cleaning plant (not shown) and, if desired, to a plant for their subsequent processing.

The plant is started by oil- or gas-fired assisting burners 19, which are mounted in the combustion passage 6 and the end wall of the cyclone chamber 7 and are shut down when the supply of fuel used in the process is initiated. These burners are subsequently used only in exceptional cases to assist the process.

Figure 2:
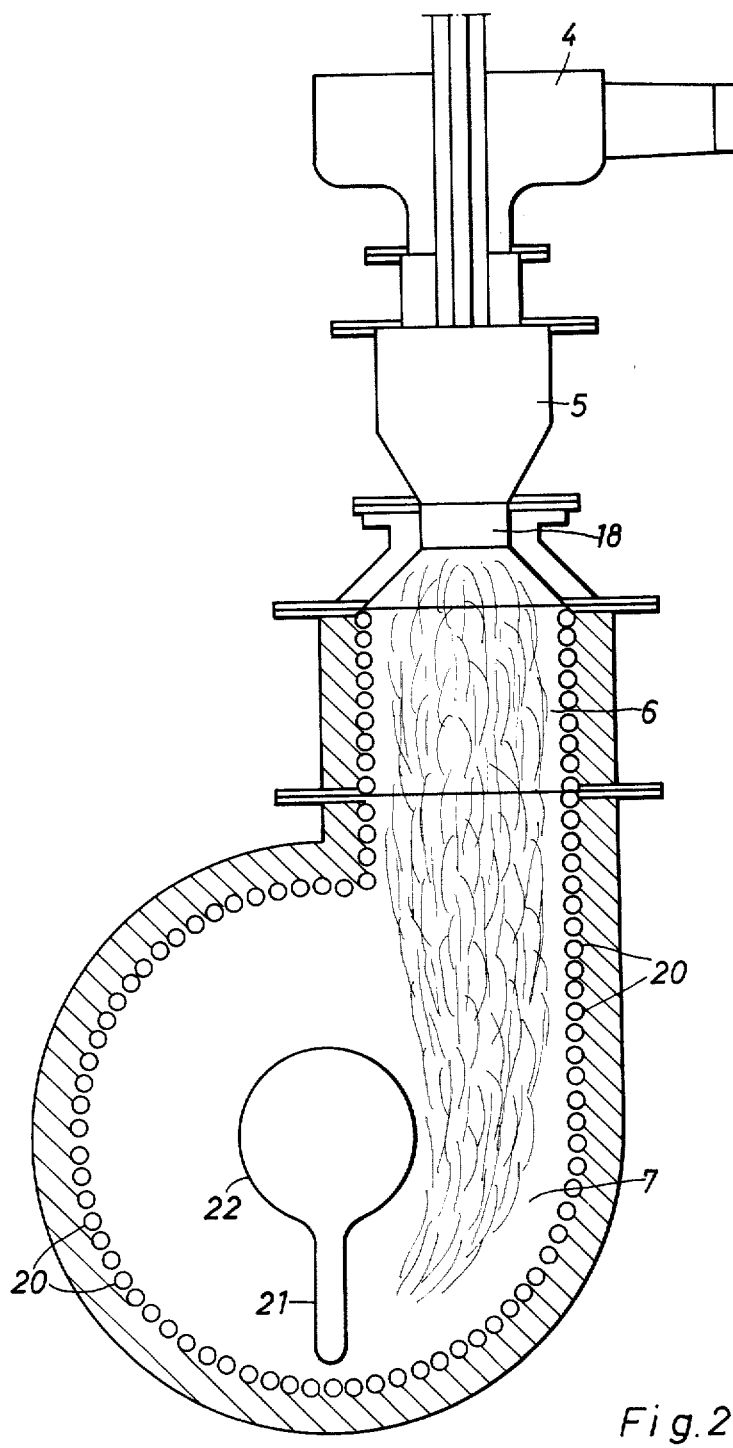
FIG. 2 is a transverse sectional view showing those parts of the apparatus which are contained in the rectangle of FIG. 1.

In FIG. 2, the proportioning device 4, the mixing chamber 5, the nozzlelike constriction 18, the combustion passage 6 and the cyclone chamber 7 are shown on a larger scale. FIG. 2 shows also the arrangement of tubes 20 for cooling the melt, the outlet slot 21 for the melt and the neck 22 through which the gases enter the secondary chamber 8.

Figure 3:
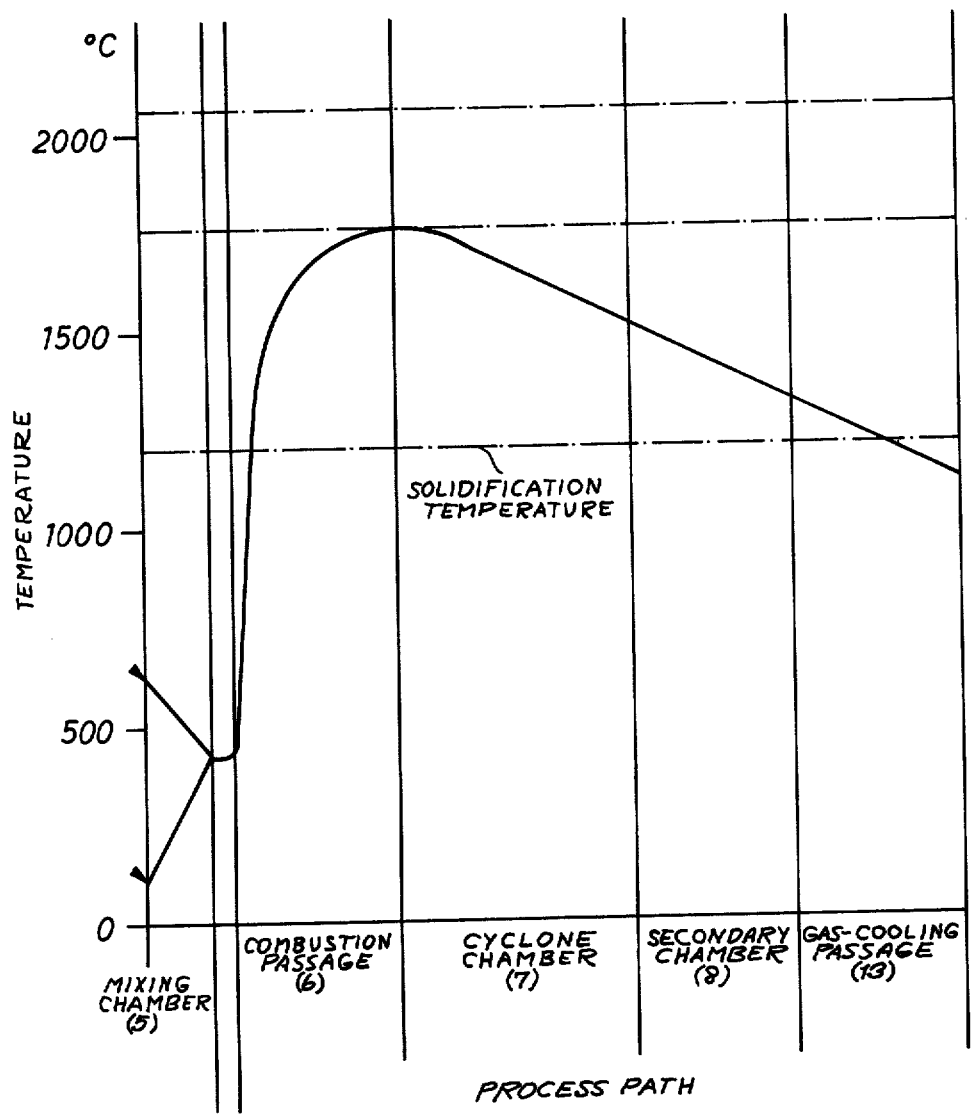
FIG. 3 is a graph which represents the general course of the temperature in the high-temperature reactor and in the gas-cooling passage.

FIG. 3 shows the basic pattern of the temperature in the mixing chamber 5, the combustion passage 6, the cyclone chamber 7 the secondary chamber 8 and the gas-cooling passage 13. The mean temperature of the gas and melt is above the solidification range of the melt in a major portion of the combustion passage 6 and thereafter as far as to the outlet from the secondary chamber 8.

SPECIFIC EXAMPLES

EXAMPLE I

Copper ore concentrate is withdrawn from the supply bin 1 at a rate of 2,500 kilograms per hour over the weighing belt conveyor 2 and through the metering rollers 3. The copper ore concentrate had an as-floated fineness (65% below 80 microns) as supplied and has been dried to a residual moisture content of 0.1% $H_2O$. It has the following composition:

| | |
|---|---|
| Cu | 25% |
| Fe | 30% |
| S | 33% |
| $SiO_2$ | 8% |
| impurities | 4% |

Through a downpipe under the metering rollers 3, the concentrate falls freely into the central feed pipe of the proportioning device 4 and the succeeding mixing chamber 5. Air is sucked by the blower 10 at a rate of 360 standard cubic meters per hour ($m^3$/hr STP) and is mixed with oxygen of 70% concentration, which is supplied from a cold vaporizer 11 at a rate of 822 $m^3$/hr STP. The mixed gases are preheated to 400°C in the heat exchanger 12.

The hot gas which contains 55% $O_2$ and the cold copper ore concentrate are concentrically discharged from the proportioning device 4 in the form of concentric free jets and owing to the turbulence of said jets and the swirl imparted to the high-oxygen combustion gas are intensely mixed in the mixing chamber 5. The solids-laden gas stream is at a temperature that is below the ignition temperature of the copper ore concentrate and in a nozzlelike constriction 18 is accelerated to a velocity of 35 meters per second (m/sec) so that the mixture is further homogenized and a back-firing from the combustion passage 6 into the mixing chamber 5 is prevented.

The vertical cylindrical combustion passage 6 has an inside diameter of 460 millimeters and a length of 530 millimeters. The accelerated suspension is immediately ignited as it enters the passage 6. As the reaction proceeds, the temperature rises quickly and at the end of the combustion passage 6 reaches its maximum of 1,600°C. When the reaction has almost been completed, the exhaust gas which is laden with molten droplets enters the horizontal cyclone chamber 7 at a mean velocity of 12 m/sec. The chamber 7 is 930 millimeters in diameter and has a length of 950 millimeters. The reaction is completed in the chamber 7. The liquid reaction products are separated from the gaseous ones by the action of centrifugal force and form a molten film having a high ability to incorporate molten particles.

By means of the tubes 20, the walls defining the combustion passage 6 and the cyclone chamber 7 are intensely cooled. Besides, the secondary chamber 8 and the gas-cooling passage 13 are cooled. By these cooling operations, saturated steam under a pressure of 25 kg/cm² gauge is produced at a total rate of 1.88 metric tons per hour, corresponding to 0.75 ton of steam per ton of concentrate.

The collected molten film consisting of a mixture of matte and slag passes through the outlet slot 21 from the cyclone chamber 7 into the secondary chamber 8 and falls through a vertical well into the settler 9, whereas the gas flows through the neck 22 into the secondary chamber 8. In this chamber, the gas is deflected twice through 90° so that molten droplets entrained by the gases leaving the cyclone can be separated and will be drained together with the melt into the settler 9. A gas which contains 45% $SO_2$, up to 3% $O_2$, slight amounts of gaseous volatilization products such as arsenic oxide, and only a few remaining molten droplets, enters the gas-cooling passage 13 at a low velocity and at a rate of 1,020 m³/hr STP. The molten droplets solidify as the gas is cooled to 300°C.

The gases leaving the gas-cooling passage 13 are supplied to a gas-purifying plant and are subsequently diluted with air and supplied to a plant for recovering sulfur, in which a reduction is carried out to produce elementary sulfur.

The settler 9 is divided by a siphonlike parting block into two stilling chambers, in which the molten material is separated into slag and very pure copper.matte. Slag containing less than 1.1% Cu is withdrawn at a rate of 1,280 kg/hr and is directly granulated. The cooper matte having a concentration of 80% is produced at a rate of 770 kg/hr and is tapped into ladles.

EXAMPLE II

In a procedure which is analogous to that of Example I, a mixture of copper ore concentrate having the same characteristics as that of Example I and slag-forming admixtures is treated at a rate of 3,000 kg/hr. The mixture is composed of the following components:

2,610 kg/hr copper concentrate
312 kg/hr quartz powder
78 kg/hr quicklime.

The high-oxygen gas which is required for the combustion and is preheated to 400°C is produced in that air at a rate of 200 m³/hr STP and oxygen of 70% concentration at a rate of 730 m³/hr STP are mixed. This ore mixture is processed under conditions which are basically the same as in the preceding example. During this treatment, the temperature in the reaction space rises to 1,525°C. The exhaust gas produced at a rate of 800 m³/hr STP contains 50% $SO_2$ and less than 2.5% residual oxygen. From the settler, slag containing less than 0.8% Cu is withdrawn at a rate of 1,470 kg/hr and matte containing 56% copper is withdrawn at a rate of 1,150 kg/hr. Saturated steam under a pressure of 25 kg/cm² gauge is produced at a rate of 1.69 metric tons per hour, corresponding to 0.65 ton of steam per ton of concentrate.

EXAMPLE III

A flotation pyrite having a moisture content below 0.2% and a particle size of 30% above 90 microns is withdrawn at a rate of 1,600 kg/hr from the supply bin 1 over the metering weighing belt conveyor 2 and through the metering rollers 3. The pyrite has the following composition:

| | |
|---|---|
| $FeS_2$ | 85 % |
| ZnS | 1.8% |
| PbS | 0.6% |
| $As_2S_3$ | 0.1% |
| $SiO_2$ | 7.0% |
| remaining gangue etc. | 5.5% |

The combustion passage 6 and the cyclone chamber 7 had the same dimensions as in Example I.

Air is sucked by the blower 10 at a rate of 590 m³/hr STP and is mixed with oxygen containing 70% $O_2$ and delivered from the cold vaporizer 11 at a rate of 775 m³/hr STP. The mixed gases are preheated to 200°C in the heat exchanger 12.

In the mixing chamber 5, the pyrite is suspended in the oxygen-containing gas mixture. In the nozzlelike constriction 18 behind the mixing chamber 5, the gaseous phase of the suspension is accelerated to a velocity of 31 m/sec. In this way, the suspension is further homogenized and a backfiring from the combustion passage 6 into the mixing chamber 5 is prevented. The pyrite is immediately ignited as the accelerated suspension enters the combustion passage 6. As a result of the combustion of the pyrite to form FeO and $SO_2$, the temperature rises quickly so that a maximum temperature of 1,700°C is reached at the end of the combustion passage 6, where the reaction has been virtually completed. In this way, optimum conditions are provided for the volatilization of the nonferrous metals contained in the pyrite, such as zinc, lead, and arsenic. At a mean velocity of 11.5 m/sec, the exhaust gas laden with molten droplets and gaseous volatilization products enters the cyclone chamber 7, in which the reaction is completed and the melt is separated from the gaseous phase by the action of centrifugal force and forms a molten film having a high ability to incorporate molten particles.

The melt collected in the cyclone chamber 7 drains through the slot 21 in the end wall to the secondary chamber 8 and drops from the latter through the well into the settler 9, from which molten material is withdrawn at a rate of 1,000 kg/hr and is granulated in a water jet. The high-FeO granules are substantially free of nonferrous metal and have the following composition:

| | |
|---|---|
| Fe | 66.5% |
| S | 1.2% |
| Zn | 0.05% |
| SiO₂, CaO, etc. | 12.5% |
| Pb and As | traces |

The exhaust gas, laden with gaseous volatilization products, passes from the cyclone chamber 7 through the neck 22 thereof into the secondary chamber 8, in which it is deflected twice through 90° so that molten droplets which are still mechanically entrained are removed and are drained together with the melt through the well into the settler 9.

The exhaust gas entering the gas-cooling passage 13 at a rate of 1,225 m³/hr STP contains 40% $SO_2$ and 3% residual $O_2$. When the exhaust gas has been cooled to a temperature of 350°C, at which all volatilization products are condensed, it is fed to a gas-purifying plant, where flue dust containing

| | |
|---|---|
| Zn | 22% |
| Pb | 11% |
| As | 2% | is collected at a rate of 85 kg/hr. The purified gas having a high $SO_2$ content is diluted with air and then supplied to a plant for producing sulfuric acid. The cooling in the high-temperature section and the gas-cooling passage results in a production of saturated steam under a pressure of 25 kg/cm² gauge and at a rate of 2.2 metric tons per hour, corresponding to 1.4 tons of steam per ton of concentrate.

EXAMPLE IV

Retort residue at a rate of 520 kilograms per hour is withdrawn from the supply bin 1 over the metering weighing belt conveyor 2 and through the metering rollers 3. The retort residue has been supplied with a moisture content of 35% $H_2O$ and before being processed was dried to a moisture content below 1% $H_2O$ and ground to the desired particle size (20% above 90 microns). The retort residue had the following composition:

| | |
|---|---|
| Fixed carbon | 40.0% |
| Fe | 16.6% |
| SiO₂ | 15.0% |
| Zn | 5.6% |
| Pb | 1.7% |
| Cu | 0.8% |
| Ag | 150 ppm |

The combustion passage 6 and cyclone chamber 7 had the same dimensions as in Example I.

For an almost stoichiometric combustion of the carbon content of the retort residue, a gas mixture containing 31% by volume $O_2$ was formed from air at a rate of 1,030 m³/hr STP and oxygen of 70% concentration at a rate of 260 m³/hr STP and without preheating was delivered by the blower 10 at a rate of 1,290 m³/hr STP into the proportioning device 4 of the high-temperature reactor.

In the mixing chamber 5, the retort residue is suspended in the combustion air. In the nozzlelike constriction at the outlet of the mixing chamber 5, the air is accelerated to a velocity of 34 m/sec so that the mixture is homogenized and a backfiring from the combustion passage 6 into the mixing chamber 5 is prevented.

The accelerated suspension is immediately ignited as it enters the combustion passage 6. The combustion of the carbon content of the retort residue proceeds quickly and raises the temperature in the combustion passage somewhat above 1,700°C at the end of the combustion passage 6 so that optimum conditions for the volatilization of all volatilizable non-ferrous metals which are contained in the retort residue are provided there. At a mean gas velocity of 13.5 m/sec, the exhaust gas laden with molten droplets and gaseous volatilization products enters the cyclone chmber 7, in which the reaction is completed and the melt is separated from the gaseous phase by the action of centrifugal force to form a molten film having a high ability to incorporate molten particles.

The exhaust gas laden with gaseous volatilization products passes through the neck 22 of the cyclone chamber 7 into the secondary chamber 8, where the gas is deflected twice through 90° so that mechanically entrained molten particles are separated and are drained through the well from the secondary chamber 8 into the settler 9 together with the melt which leaves the cyclone chamber 7 through the slot 21 in the form of a jet.

In the settler 9, a melt which is substantially free of nonferrous metal and has a lower specific gravity is separated at a rate of 230 kg/hr. This melt is granulated in a water jet and has the following composition:

| | |
|---|---|
| Fe | 35.3% |
| SiO₂ | 27.3% |
| Al₂O₃, CaO, MgO, etc. | 26.5% |
| Zn | 0.6% |
| Pb | 0.06% |
| Cu | 0.6% |
| Ag | traces |

Besides, a copper matte having a higher specific gravity and containing 30% Cu is separated at a rate of 5 kg/hr and is intermittently tapped off.

The combustion gases are still at a temperature of 1,600°C as they enter at low velocity into the gas-cooling passage 13, in which they are cooled to 300°C. The volatilization products which are thus condensed are collected in a bag filter. Flue dust is collected at a rate of 60 kg/hr and has the following nonferrous metal values:

| | |
|---|---|
| Zn | 39.2% |
| Pb | 13.7% |
| Cu | 3.0% |
| Ag | 1140 ppm |

The cooling of the high-temperature section and the gas-cooling passage results in the production of saturated steam under a pressure of 15 kg/cm² gauge and at a rate of 2,600 kg/hr, corresponding to 5.0 tons of steam per ton of retort residue.

We claim:

1. A pyrometallurgical process for recovering molten and gaseous products from melt-forming fine-grained solids, said process comprising the steps of:

mixing a high-oxygen gas with fine-grain solids reactive therewith at a certain reaction temperature in a mixing passage and introducing the resulting mixture at a temperature below said reaction temperature into a downwardly open vertical combustion passage;

reacting said mixture in said passage at a temperature above said reaction temperature to produce a suspension of molten particles in a gas;

thereafter introducing said suspension into a generally horizontal cyclone chamber having an intensive cooled wall in a direction tangential to a circle centered on the axis of said chamber, thereby forming a layer of molten material along said wall; and discharging molten and gaseous products separately from said chamber.

2. The process defined in claim 1 wherein said high-oxygen gas and said solids are mixed with one another or with an energy carrier to form the mixture at a velocity sufficient to prevent backfiring from said combustion passage into said mixing passage, said wall being cooled by evaporation of water against a superatmospheric pressure.

3. The process defined in claim 1, further comprising the step of accelerating said mixture into said chamber to a velocity sufficient to prevent backfiring from said combustion passage into said mixing passage.

4. The process defined in claim 1, further comprising the step of controlling the residence time of said mixture in said combustion passage to ensure at least 80% of completion of the reaction of said solids when said suspension leaves said passage.

5. The process defined in claim 1, further comprising the step of controlling the temperature in said cyclone chamber to maintain the temperature of the gases passing therefrom at least 100°C above the temperature of solidification of a melt formed from said particles.

6. The process defined in claim 1, further comprising the step of admixing with said fine-grain solids and said high-oxygen gas a gaseous fuel as an energy carrier.

7. The process defined in claim 1, further comprising the step of quenching the gases leaving said cyclone chamber to a temperature below the condensation point of volatile constituents contained therein.

8. The process defined in claim 7 wherein the gases leaving said cyclone chamber are quenched by injecting water into them.

9. The process defined in claim 7 wherein the gases leaving said cyclone chamber are quenched by admixing air with them.

10. The process defined in claim 1 wherein said fine-grain solids are sulfidic or oxidic ferrous-metal or non-ferrous metal ores or ore concentrates or intermediates of a metallurgical process.

* * * * *